Aug. 10, 1965  W. R. FORSTER  3,199,540
VALVE DEVICE

Filed Sept. 28, 1962  3 Sheets-Sheet 1

INVENTOR.
Walter R. Forster
BY
Ralph W. McIntire, Jr.
Attorney

Aug. 10, 1965 W. R. FORSTER 3,199,540
VALVE DEVICE
Filed Sept. 28, 1962 3 Sheets-Sheet 2
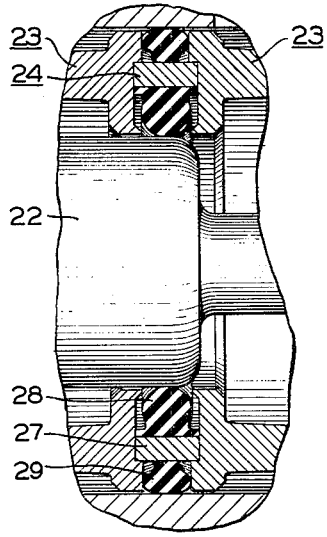
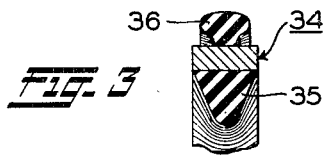
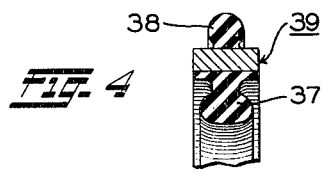
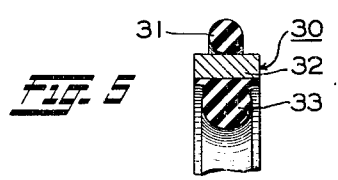
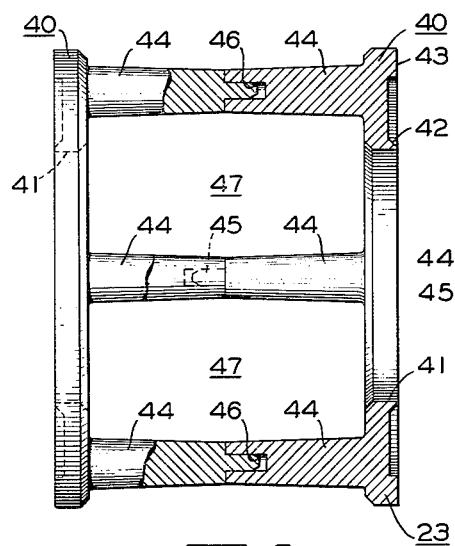
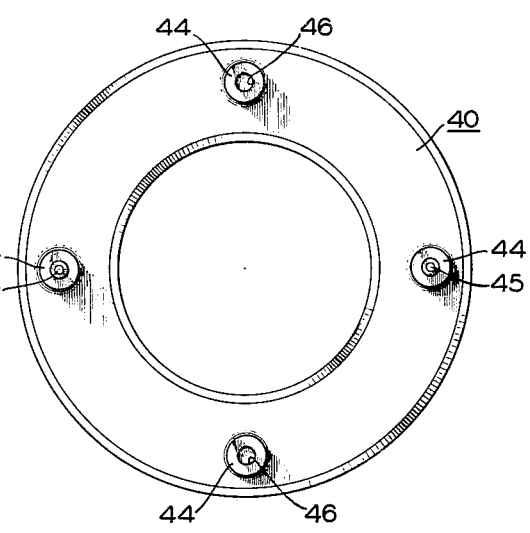
INVENTOR.
Walter R. Forster
BY
Ralph W. McIntire, Jr.
Attorney INVENTOR.
Walter R. Forster

United States Patent Office

3,199,540
Patented Aug. 10, 1965

3,199,540
VALVE DEVICE
Walter R. Forster, Pittsburgh, Pa., assignor to Westinghouse Air Brake Company, Wilmerding, Pa., a corporation of Pennsylvania
Filed Sept. 28, 1962, Ser. No. 226,853
13 Claims. (Cl. 137—625.69)

This invention relates generally to valve devices having a removable bushing and sealing structure, and relates more particularly to such structure comprising a sealer assembly for effecting a seal between two relatively movable members, such as a valve casing and a movable plunger valve member therein.

Heretofore, to provide ease of assembly, repair, replacement or interchange of parts at reduced production costs, sealer assemblies for valve devices have comprised identical, or substantially identical, annular spacer elements and annular resilient sealer members alternately disposed in aligned, contiguous relationship within a bore in an apertured valve casing, the number of spacer elements and sealer members depending upon the size of the valve. The spacer elements effectively lock the sealer members in position in the bore to effect a seal between the casing and spacer elements and between the spacer elements and a valve plunger disposed for axial movement in said aligned spacer elements and sealer members, with the casing apertures communicating with the bore in a predetermined standard spaced relationship to mate with standard radially disposed openings in the spacer members. The axial movement of the plunger valve effects selective intercommunication of the various ports in the casing.

Sealer assemblies of this general nature have been generally unsatisfactory because of the difficulty in obtaining an effective seal between the plunger valve member and the casing while at the same time minimizing friction between the plunger and sealer members. Further, because of the desirable loose fit between the spacer elements and the bore to permit ease of assembly and replacement of the spacer elements and sealer members, excessive wear occurred between the spacer elements and the plunger member as the plunger member moved axially in the bore.

Generally stated, it is an object of this invention to provide improved spacer elements and sealer members in a sealer assembly disposed between a valve casing and a valve member to decrease costs, to provide ease of assembly, repair, replacement and interchange of parts in the valve assembly, to maintain an effective seal between a valve casing and a movable member while minimizing friction between the movable member and the sealer members, and to minimize wear between the movable valve member and the spacer elements.

In the present invention, production costs are reduced by preferably forming each spacer element in two mating parts for pre-assembly prior to insertion in the valve casing, thus eliminating the greater cost of machining single piece spacer elements. To provide sealing between the spacer elements at their ends and the casing, and between the spacer elements at their ends and the plunger member, the sealer members each comprise an annular rigid member carrying a pair of concentrically disposed annular resilient members, one annular resilient member disposed on the outside of the annular rigid member for sealing engagement with the casing and the other annular resilient member carried on the inside of the annular rigid member for sealing engagement with the plunger member, the annular rigid member serving to prevent interaction of compression between the annular resilient members mounted thereon, so that a predetermined compression applied to each annular resilient member may be maintained independently of the other. The annular rigid member also serves as a rigid connector between the spacer members when the spacer elements are assembled in a bore in a casing, to thus provide an axially rigid sealer assembly structure eliminating undesired axial compression upon the annular resilient members. To permit elimination of close tolerances between the spacer elements and the bore, and yet at the same time assure coaxial placement of the spacer elements with respect to each other and with respect to the plunger member, thus minimizing wear between the plunger and the spacer elements, the spacer elements are provided with laterally disposed annular shoulder means for seating on the ends of the annular rigid member of the adjacent sealer members, whereby the annular rigid member effects a centering of the adjacent spacer elements within the bore. To assure a relatively constant minimum compression between the sealer members and the plunger member and yet prevent a breaking of the seal between the plunger and the inner annular resilient member of the sealer member in response to high pressure fluid flow within the bore, the spacer elements are provided with second laterally disposed annular shoulder means for limiting or minimizing lateral movement or distortion of the inner annular resilient member, and at the same time permit some freedom of lateral distortion of the annular resilient member as the plunger means moves reciprocably in the bore, thus minimizing static friction.

These and other objects and advantages of the invention will become apparent from the following more detailed description of the invention and from the accompanying drawings, in which:

FIG. 2 is an enlarged sectional view of the valve device of FIG. 1, showing one of the sealer members and portions of the corresponding adjacent spacer elements in the sealer assembly.

FIG. 3 is a fragmentary sectional view of a modification of the sealer member.

FIG. 4 is a fragmentary sectional view of another modification of the sealer member.

FIG. 5 is a fragmentary sectional view of yet another modification of the sealer member.

FIG. 6 is a front elevational view, shown partly in section, of one of the two-piece spacer elements of the sealer assembly in the valve device of FIG. 1.

FIG. 7 is an end elevational view of the left-hand piece of the two-piece spacer element of FIG. 6, viewed from the side having the legs.

Those familiar with the state of the art of sealer assemblies disposed between relatively movable members will recognize that the present invention may be used in a variety of devices of different types, but a four-way valve device has been chosen in this application for purposes of illustrating a particular embodiment of the present invention.

Figure 1:
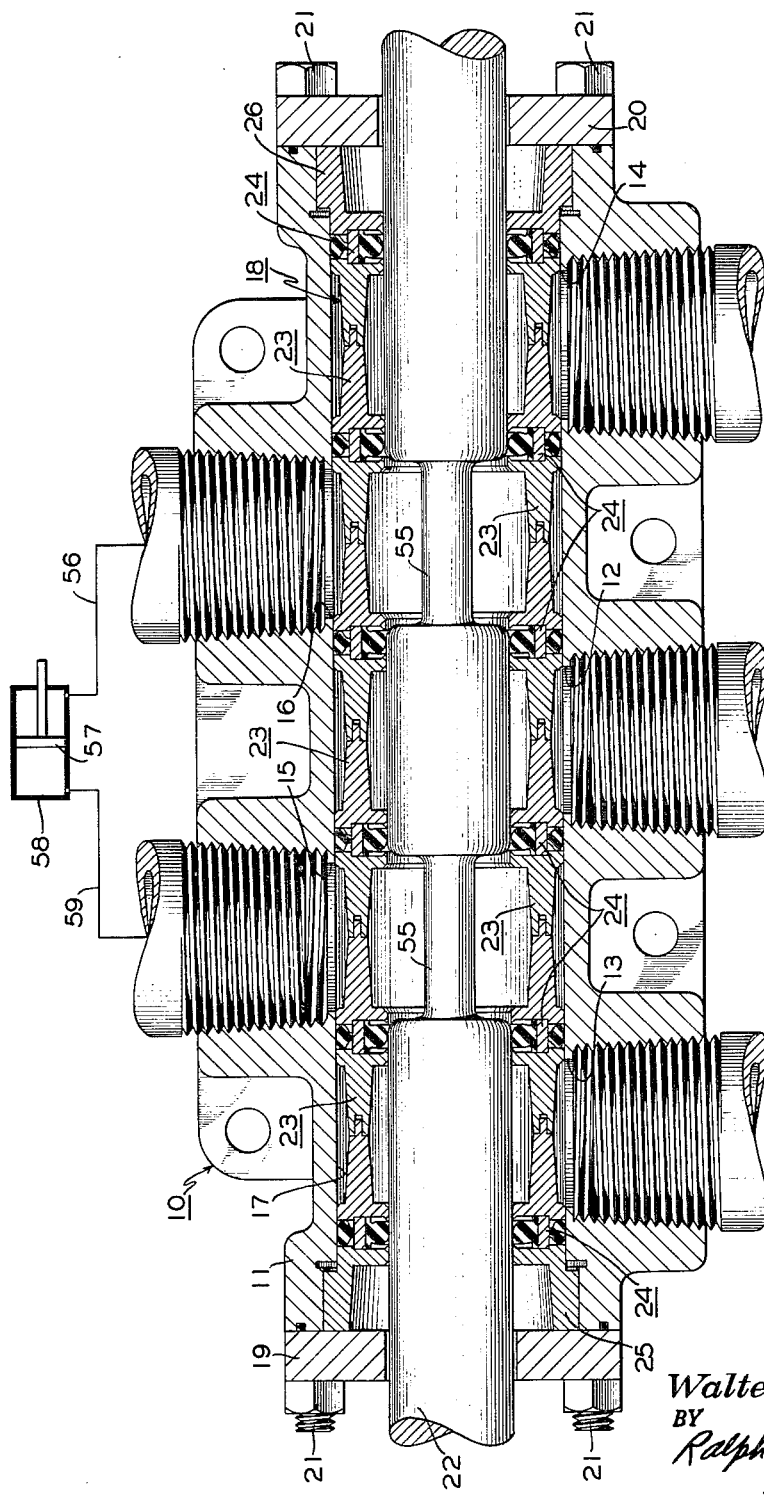
FIG. 1 is a sectional view of a valve device embodying the invention, and shown connected to control operation of a simple piston motor device.

Referring now to the drawings, particularly to FIG. 1 thereof, there is shown a valve device 10 comprising a casing or body member 11 having therein a supply port 12, a pair of exhaust ports 13, 14, and a pair of working ports 15, 16, all ports communicating with a central through bore 17. A sealer assembly, generally indicated at 18, is removably disposed in the bore 17 by means of end caps 19, 20 each covering one end of the bore 17 and attached to the casing by means of a plurality of bolt and nut assemblies 21 interconnecting the end caps. The sealer assembly 18 is disposed in the space between the wall of the bore 17 and a plunger valve member 22 disposed in the bore for reciprocal axial movement therein between a shut-off position and either of two working positions, to be hereinafter described in detail.

The sealer assembly 18 comprises a plurality of identical, annular, sleeve-like elements or spacer elements 23 disposed in bore 17 in alternate relationship with a plurality of identical annular sealer members 24, the assembly being terminated at each end by an end member 25, 26, the end members being closely fitted in bore 17 and abutted by the previously described end caps 19, 20 which thus removably fix the sealer assembly 18 in place in the bore 17.

A preferred sealer member 24, shown generally in FIG. 1 and in more detail in FIG. 2, comprises an annular rigid member 27, preferably comprised of a metal such as brass or non-sintered iron, and having a diameter substantially smaller than that of the bore 17, the annular rigid member serving as a support for a pair of concentric annular resilient members 28, 29 mounted inwardly and outwardly, respectively, of the annular rigid member 27. The outer annular resilient member 29 is substantially oval in cross section, and at its widest point is preferably of such width with respect to the width of the annular rigid member 27 that when the sealer member 24 is disposed in the bore 17 in abutting relationship with adjacent spacer elements 23, the annular resilient member 29 is slightly compressed laterally by the adjacent spacer elements 23 to cause the annular resilient member 29 to flow and expand against the casing bore 17 to insure an effective seal. This feature provides for minimal compression of the outer annular resilient member 29 against the bore 17 to provide easy installation or removal of the sealer member 24 in the bore 17, and thereafter provides for increased axial pressure upon annular resilient member 29 to effect positive sealing when the spacer elements 23 are pressed in abutting relationship with the annular rigid member 27 of sealer elements 24 at the completion of assembly of sealer assembly 18 in the bore 17. Thus, it is seen from the foregoing that the width of the annular resilient members may be chosen either to underfill, fill or overfill the gap between adjacent spacer elements when in abutting relationship with the annular rigid member, to thus selectively provide any desired axial compression of the annular resilient members. At the same time, the abutting relationship of the annular rigid spacer members with the annular rigid members 27 of the sealer members 24 throughout the sealer assembly 18 provides an axially rigid structure preventing undesired pressure upon the annular resilient members 28, 29.

The inner annular resilient member 28 of sealer member 24 is substantially circular in cross section and is narrower than the width of the annular rigid member 27 so that placement of the annular rigid member 27 in abutting relationship with the adjacent spacer elements 23 leaves space between the annular resilient member 28 and the spacer elements 23 to permit lateral bending or distortion of the annular resilient member 28 as the plunger valve member 22 is moved axially in the bore 17 to thus limit the static friction on the spool or plunger valve member 22. As hereinatfer described in detail with respect to the spacer elements 23, a limit means is provided in the sealer assembly 18 to limit lateral movement of the annular resilient member 28 to prevent the breaking of the seal between the annular resilient member 28 and the spool member 22, such as would likely occur under high fluid flow.

From the foregoing it is seen that the annular rigid member 27 disposed between resilient members 28 and 29 eliminates any undesired axial compression of the annular resilient ring members 28, 29 by the spacer elements 23 when assembled in the spacer assembly 18, and eliminates the interaction of compression between the outer and inner annular resilient members 28, 29 so that the compression characteristics of each ring is independent of the other, thus permitting a higher compression sealing between the outer annular resilient member 29 and the bore 17, while permitting a lower compression between the inner annular resilient member 28 and the spool member 22. Preferably, at least the inner annular resilient member 28 is bonded to the annular rigid member 27, as by vulcanization, to prevent the annular resilient member 28 from pulling away from the annular rigid member 27 under the influences of high fluid pressure in the bore 17 when the valve is in operation.

In FIG. 5 there is shown a sealer member 30 which is a modification of sealer member 24, which modification is substantially identical to sealer member 24 described above and shown in FIG. 2, except that a conventional or standard O-ring 31 is substituted for the previously described outer annular resilient member 29, with the O-ring 31 being of such width relative to the width of the annular rigid member 32 as to abut the adjacent spacer elements 23 when the spacer elements 23 and sealer members 30 are assembled in the sealer assembly 18. This is a less expensive construction which provides substantially the same sealing effect. The inner annular resilient member 33 is identical to inner annular resilient member 28 of the sealer member of FIG. 2.

FIG. 3 relates to another sealer member 34, which is also a modification of the sealer member 24 described in FIG. 2. Sealer member 34 comprises an inner annular resilient member 35, which in cross section is tapered radially inwardly toward its inside smaller diameter to thus minimize the area contact between the annular resilient member 35 and the spool member 22 to provide lower friction than that provided between the inner anular resilient member and the spool member shown and described above with respect to the modifications shown in FIGS. 2 and 5, and in the hereinafter described FIG. 4. The outer annular resilient member 36 is identical to outer annular resilient member 29 in sealer member 24 of FIG. 2.

FIG. 4 relates to another sealer member, which is a modification of sealer member 24 of FIG. 2, and is characterized by an oval inner annular resilient member 37 similar to outer annular resilient member 29 of FIG. 2, and an outer annular resilient O-ring 38, the annular resilient members being separated and supported by an annular rigid member 39.

The spacer elements 23, for spacing and fixing the various above-described sealer members 24, 30, 34 or 39 in predetermined position in the bore 17, are generally sleeve-like elements radially ported to pass fluid to and from whichever of the ports 12–16 in the casing 10 are adjacent thereto when the sealer assembly 18 is disposed in assembled relationship in the bore 17. Each spacer element 23 may be constructed as a single machined element, as shown in detail in FIGS. 8 and 9, or of a pair of joined half elements, as shown in detail in one embodiment in FIGS. 6 and 7, and in yet another embodiment shown in FIGS. 10 and 11.

Referring now to FIGS. 6 and 7, there is shown a spacer element 23 of two-piece construction, and which is illustrated in FIG. 1 in assembled relationship with the sealer members 24 of FIG. 2. The spacer element 23 is comprised of a pair of substantially flat identical half elements 40, 40 each having a central aperture at 41 to pass either the spool member 22 or a fluid, depending upon the axial position of the spool member 22 in the aperture 41 of the spacer element 23, as hereinafter described in detail. The rim of the aperture 41 comprises a laterally extending annular ridge 42 which, when disposed adjacent a sealer member such as 24 as disclosed in FIG. 1 and FIG. 2, serves to limit the lateral movement of the inner annular resilient member 28 as the spool member 22 slides thereover, to thus maintain a relatively fixed friction between the spool 22 and the annular resilient member 28, and to prevent the annular resilient member 28 from lifting off the spool 22 during high fluid flow. A laterally disposed annular ridge or shoulder 43 is provided near the periphery of each half element 40 to override the edge of the annual rigid member 27 of the previously described sealer member 24, as shown in FIGS. 1 and 2, to effect centering of the spacer elements 23 in the bore 17, thus reducing the cost of production and assembly by eliminating the necessity of a close tolerance and tight fit between the bore 17 and the spacer elements 23, and thus eliminate precision machining of the spacer element 23 with respect to the bore 17. It is seen that the tightly fitted sealer member 24 fixes and centers the annular rigid member 27 thereof, which member 27, in turn, supports and centers the spacer elements 23 in bore 17 to minimize wear which would otherwise occur between the spool member 22 and the edges of apertures 41 in spacer element 23 as the spool is moved axially through the aperture 41 during operation of the valve. Each spacer element 23 includes thereon four laterally disposed parallel leg members 44, two of the leg members 44 having guide pins 45 on the ends thereof, while the other two leg members have guide holes 46 in the ends thereof. The spacer half elements 40 are die cast in the form described above and joined together in pairs with the guide pins 45 in one half element disposed in the guide holes 46 of the other half element to form a rigid spacer element 23, the spaces 47 between the leg pairs comprising ports for the passage of fluid. The foregoing die cast construction of the spacer element 23 provides inexpensive mass production.

Figure 10:
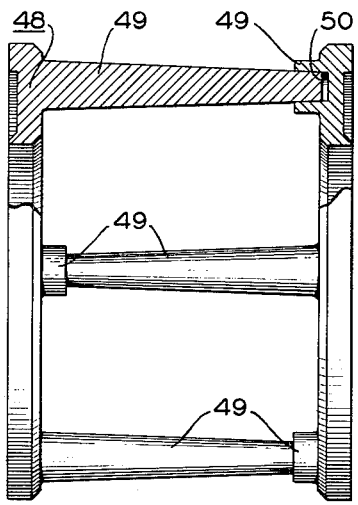
FIG. 10 is a side elevational view, taken partly in section, of another modification of the two-piece spacer element.
Figure 11:
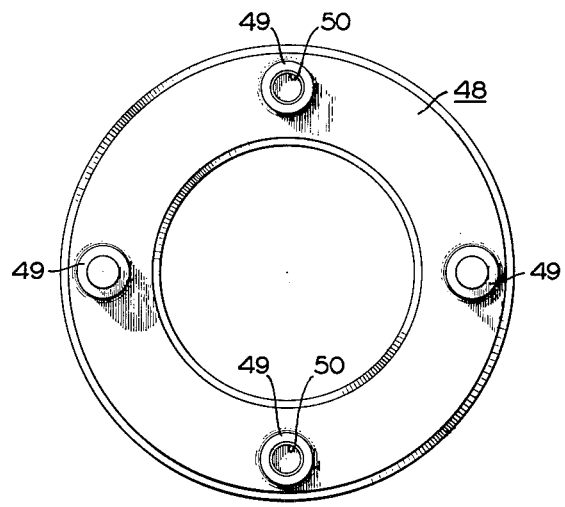
FIG. 11 is an end elevational view of the left-hand piece of the two-piece spacer element of FIG. 10, viewed from the side having the legs.

In FIGS. 10 and 11 there is shown another form of spacer element 48, in which the leg members 49 are characterized in that two of the opposing leg members 49 on each half elements are longer than the remaining two leg members, the longer members having no separate guide pin as such, while the shorter leg members essentially comprise rims for large holes 50 for receiving the ends of the longer leg members when a pair of such spacer half elements are joined, as shown. The juncture between each leg and corresponding hole is in staggered relationship with the adjacent junctures, thus providing greater rigidity when the spacer element 48 is assembled. This structure provides for the ends of the longer leg 49 to serve as pins so that a larger and stronger pin and hole relationship is provided in leg members which are not substantially thicker than the leg members 44 of FIGS. 6 and 7. Moreover, the longer legs 49 are tapered toward the distal end to mate with a correlative taper of the holes 50 in the shorter leg members, so that when the spacer elements 48 are assembled in the bore 17, the half elements of spacer member 48 may be squeezed toward each other to provide a tight fit between the spacer element halves under axial compression provided on the sealer assembly 18 by the assembly end members 25, 26 of FIG. 1, thus providing an adjustable latitude of length of the individual spacer elements 48 for better fitting in the bore 17.

Figure 8:
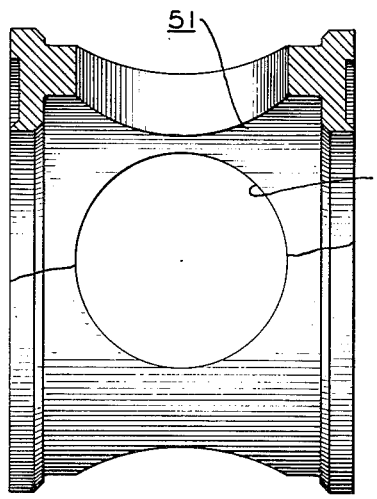
FIG. 8 is a front elevational view, taken partly in section, of a one-piece spacer element.
Figure 9:
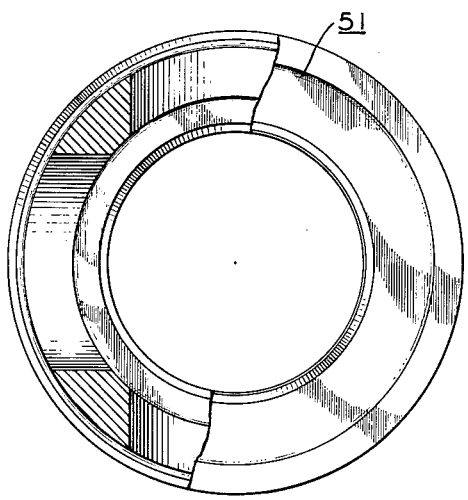
FIG. 9 is an end elevational view, taken partly in section, of the spacer element of FIG. 8.

In FIGS. 8 and 9 there is shown another form of a spacer element comprised of a single element 51 which may be die cast in the form shown and machined to provide ports. This construction provides maximum rigidity when assembled in the bore 17, but is more expensive in construction than the above-described two-piece spacer elements of FIGS. 6, 7 and 10, 11.

The plunger member 22 of the valve device 10 is conventional in construction and comprises a cylindrical member having restricted neck portions 55 spaced periodically along the length thereof, the cylindrical body at times engaging the inner annular resilient member 28 of sealer member 24 when the main body of the spool member 22 is adjacent thereto, and at other times disposing the neck portions 55 adjacent the inner annular resilient members 28 to permit fluid to pass effectively from one spacer member element to another through apertures 41. Thus, it is seen that as the plunger member 22 is moved axially from one position to another, various ones of the ports 11–16 are interconnected internally of the sealer assembly 18 to provide a variety of directions of fluid flow therein. For example, in FIG. 1, when the plunger member 22 is in the closed position as shown, fluid supply from the supply port 12 is prevented from passing within the sealer assembly 18 to either one of the delivery ports 15, 16. When the plunger member 22 is moved to the left of the closed position to dispose one of the restricted neck portions 55 in substantially a straddling relationship with the adjacent sealer member 24, it is seen that fluid flow occurs from supply port 12 past adjacent neck portion 55, through delivery port 16, through piping 56 to one side of a piston 57 in a cylinder 58 to move the piston to the left while fluid is exhausted from the left side of the piston through delivery port 15, and through exhaust port 13. At the same time, exhaust port 14 is closed by the main body portion of plunger 22. Assuming now that the plunger member 22 is moved to the right, from the closed position, it is seen that fluid is supplied from supply port 12 through delivery port 15 and piping 59 to the left side of the piston 57 in the cylinder 58 while fluid is exhausted from the right side of the piston through delivery port 16 and exhaust port 14. At the same time, exhaust port 13 is closed.

In the above operation, it will be seen that the pressure in any port 12–16 will be applied to the sealer member 24 adjacent to and associated with that particular port, but will not deform any of the other sealer members because of the rigid relationship between the spacer elements 23 and the sealer members 24 as provided by the annular rigid member 27 of the sealer members 24. It will also be seen that only the inner annular resilient member 28 of the sealer member 24 is deformed by the passage of fluid when the spool is moved axially, thus the deformation is limited by the annular shoulder 42 on the spacer element 23. It will also be appreciated that the centering shoulders 43 on the spacer elements 23, which override the annular rigid member 27 of each sealer member 24, centers the spacer elements 23 to thus minimize wear which otherwise would occur between the spool member 22 and the spacer elements 23 at the apertures 41.

Having now described the invention, what I claim as new and desire to secure by Letters Patent is:

1. A sealer assembly for disposition in a bore in a casing to effect a seal between the casing and a member movable in the bore, comprising:

(a) an annular sealer member for removable disposition in said bore in coaxial relationship therewith and comprising a pair of resilient concentrically disposed annular members separated and supported by a rigid annular member, whereby the outer annular resilient member of said pair of annular resilient members is adapted to sealingly engage the casing and the inner resilient member of said pair of concentric resilient members is adapted to sealing engage the movable member, and (b) an annular rigid spacer element removably disposed on each side of said sealer member in abutting relationship with said annular rigid member, each rigid spacer element including a shoulder engaging the annular rigid member to dispose said annular rigid member coaxially with said rigid spacer element in said bore.

2. The sealer assembly of claim 1 in which said shoulder overrides the annular rigid member on the outer diameter of said annular rigid member.

3. The sealer assembly of claim 1 in which each annular rigid spacer element includes a second shoulder laterally extending toward the inner one of said pair of concentric resilient member to limit axial distortion of the inner peripheral portion thereof due to axial movement of the movable member in the bore.

4. A sealer assembly for disposition in different casings having bores which differ only in length, said assembly serving to effect a seal between the casing and a member movable in the bore, comprising:
  (a) a plurality of annular sealer members for removable disposition in said bore in coaxial relationship therewith, each comprising a pair of resilient concentrically disposed annular members separated and supported by a rigid annular member whereby the outer one of said concentric pair of resilient members is adapted to sealingly engage the casing and the inner one of said resilient members is adapted to sealingly engage the movable member,
  (b) a plurality of rigid annular spacer elements, each disposed between an adjacent pair of said sealer members in abutting relationship with the rigid annular member in the adjacent sealer members to space and rigidly fix each sealer member with respect to the others,
  (c) a pair of annular end members, each one of said pair disposable in said bore at a different end of said assembly, and rigidly abutting the rigid annular member of the sealer members on the corresponding end of the sealer assembly,
  (d) a pair of end caps for said bore, each one of said pair attachable to opposite ends of said casing and engageable with a corresponding one of said end members to fix said assembly in said bore, and
  (e) each spacer element including axially extending shoulder means overriding the rigid member of each said adjacent pair of sealer members to dispose each said spacer element coaxially with the sealer members, and said end members each include a shoulder means overriding the rigid member of the adjacent sealer member.

5. A valve device having a removable sealer assembly, comprising:
  (a) a body member having a bore therein and having ports through said body and communicating with said bore along its length,
  (b) a plunger valve member axially movable in said bore for controlling fluid flow between said body ports,
  (c) a sealer assembly removably disposed in said bore and including a plurality of annular sealer members and a plurality of rigid annular spacer elements,
  (d) said sealer members being removably disposed in said bore in coaxial relationship therewith, each comprising a pair of resilient concentrically disposed annular members separated and supported by a rigid annular member whereby the outer one of said concentric pair of resilient members is adapted to sealingly engage the casing and the inner one of said resilient annular members is adapted to sealingly engage the movable member,
  (e) said rigid annular spacer elements each disposed between an adjacent pair of said sealer members in abutting relationship with the rigid annular member in the adjacent sealer members to space and rigidly fix each sealer member with respect to the others, said spacer elements each including port means to provide for fluid flow from one valve body port to the plunger valve member, and including laterally extending shoulder means engaging the rigid annular member of each adjacent sealer member whereby the spacer element is disposed coaxially with the bore, and
  (f) means disposed at the ends of the bore and engaging said sealer assembly for removably fixing said sealer assembly in said bore.

6. The valve device of claim 5 in which each spacer element includes additional shoulder means for limiting axial movement of the inner one of said resilient members of each adjacent sealer member.

7. A sealer assembly for disposition between a pair of relatively movable members, one member having a bore therein and the other member disposed for reciprocal movement in said bore, comprising:
  (a) an annular sealer member comprising a pair of resilient concentrically disposed annular members separated and supported by a rigid annular member,
  (b) an annular rigid spacer element disposed on each side of said annular sealer member in abutting relationship with said rigid annular member, and
  (c) the noncompressed maximum width of the outer one of said pair of concentric resilient members in a direction axially of the bore being greater than the space between the annular rigid spacer elements when the annular rigid spacer elements are assembled in abutting relationship with the rigid annular member whereby said outer resilient member is radially compressed against the surface defining the bore in said one member to effect a tight seal, and
  (d) said outer one of said pair of concentric resilient members when in an axially non-compressed condition having an outside diameter substantially the same as said bore for providing easy insertion of said sealer member in said bore.

8. A sealer assembly for disposition between a pair of relatively movable members, one member having a bore therein and the other member disposed for reciprocal movement in said bore, comprising:
  (a) an annular sealer member comprising a pair of resilient concentrically disposed annular members separated and supported by a rigid annular member,
  (b) an annular rigid spacer element disposed on each side of said annular sealer member in abutting relationship with said rigid annular member, and
  (c) the inner member of said pair of resilient concentric members being radially tapered inwardly to provide a substantially V-shaped cross section to facilitate lateral flexing of the inner periphery of said inner member in the direction of movement of said other member for minimizing static friction therebetween.

9. A sealer assembly for effecting a seal between a ported valve casing and a valve member, movable axially in a bore therein, comprising:
  (a) a plurality of annular sealer members for removable disposition in said bore in coaxial relationship therewith to effect a seal between the casing and the movable valve member,
  (b) a plurality of rigid annular spacer elements, each disposed between an adjacent pair of said sealer members in abutting relationship therewith, and
  (c) each said spacer element comprising two identical half members, each half member comprising an annular base member having a plurality of spaced axially extending integral leg members, each leg member and one half member having an interlocking means on the end thereof to join with interlocking means on the corresponding leg of the other half member, the space between the adjacent joined leg pairs forming radially disposed ports.

10. The sealer assembly of claim 9 in which the interlocking means on some of the leg members of each half member comprises a pin, and in which the interlocking means on the remaining leg members of each half comprises a hole for receiving a pin.

11. The sealer assembly of claim 9 in which some of the leg members on each half member are axially tapered at least on the end portion thereof, and in which the remaining leg members on each half include a tapered hole in the end thereof for receiving a tapered end of a leg member on the other half.

12. The sealer assembly of claim 9 in which the leg members on each said half member are of substantially equal length.

13. The sealer assembly of claim 9 in which at least one of the leg members on each half member is of a different length than the others to provide a series of staggered junctures between leg pairs of joined opposing half members.

References Cited by the Examiner

UNITED STATES PATENTS

| | | | |
|---|---|---|---|
| 2,747,611 | 5/56 | Hewitt | 251—324 XR |
| 2,892,644 | 6/59 | Collins | 251—324 XR |
| 3,095,713 | 7/63 | Sahlmann | 277—9 XR |

FOREIGN PATENTS

| | | |
|---|---|---|
| 1,061,147 | 7/59 | Germany. |
| 791,607 | 3/58 | Great Britain. |

LAVERNE D. GEIGER, *Primary Examiner.*

UNITED STATES PATENT OFFICE
CERTIFICATE OF CORRECTION

Patent No. 3,199,540

August 10, 1965

Walter R. Forster

It is hereby certified that error appears in the above numbered patent requiring correction and that the said Letters Patent should read as corrected below.

Column 8, line 63, for "and" read -- on --; line 71, after "half" insert -- member --.

Signed and sealed this 5th day of November 1968.

(SEAL)
Attest:

Edward M. Fletcher, Jr.
Attesting Officer

EDWARD J. BRENNER
Commissioner of Patents